United States Patent
Goldenberg et al.

(10) Patent No.: US 8,464,153 B2
(45) Date of Patent: Jun. 11, 2013

(54) COPYING AN OBJECT IN AN ANIMATION CREATION APPLICATION

(75) Inventors: Joshua Goldenberg, Oakland, CA (US); Louise Rasmussen, Fairfax, CA (US); Adam Schnitzer, Petaluma, CA (US); Domenico Porcino, San Rafael, CA (US); Lucas A. Kovar, San Francisco, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 102 days.

(21) Appl. No.: 13/038,324

(22) Filed: Mar. 1, 2011

(65) Prior Publication Data

US 2012/0226983 A1 Sep. 6, 2012

(51) Int. Cl.
  *G06F 13/00* (2006.01)
(52) U.S. Cl.
  USPC ............ 715/724; 715/977; 715/719; 345/473
(58) Field of Classification Search
  USPC ................................ 715/724, 977, 719; 707/7
  See application file for complete search history.

(56) References Cited

U.S. PATENT DOCUMENTS

| | | | | |
|---|---|---|---|---|
| 6,118,459 A * | 9/2000 | Hunter | ........................... | 345/474 |
| 6,144,385 A * | 11/2000 | Girard | ........................... | 345/424 |
| 6,191,798 B1 * | 2/2001 | Handelman et al. | .......... | 345/473 |
| 6,320,988 B1 * | 11/2001 | Yamaguchi et al. | .......... | 382/276 |
| 7,106,334 B2 * | 9/2006 | Imagawa et al. | ............... | 345/474 |
| 7,440,819 B2 * | 10/2008 | Morel et al. | ................... | 700/245 |
| 7,692,657 B2 * | 4/2010 | Gauthier | ........................ | 345/473 |
| 7,859,538 B2 * | 12/2010 | Isner et al. | ..................... | 345/473 |
| 7,859,540 B2 * | 12/2010 | Dariush | ......................... | 345/474 |
| 8,094,156 B2 * | 1/2012 | Smith | ............................ | 345/473 |
| 8,194,082 B2 * | 6/2012 | Smith | ............................ | 345/473 |
| 8,243,078 B2 * | 8/2012 | Perlin | ............................ | 345/473 |
| 2004/0070593 A1 * | 4/2004 | Neely et al. | .................... | 345/716 |
| 2004/0174399 A1 | 9/2004 | Wu et al. | | |
| 2007/0050722 A1 | 3/2007 | Schulz et al. | | |
| 2007/0271270 A1 * | 11/2007 | Dubinko et al. | .................. | 707/7 |
| 2007/0283276 A1 * | 12/2007 | Neely et al. | ..................... | 715/747 |

OTHER PUBLICATIONS

"User Manual—A-320 Digital Multimedia Player" Dingoo Digital, publication date believed to be earlier than Mar. 2010, 18 pages.
'System Events and Mouse Messages' [online]. Microsoft, 2011, [retrieved on May 11, 2011]. Retrieved from the internet: <URL: http://msdn.microsoft.com/en-us/library/ms703320(v=VS.85). aspx>.

(Continued)

*Primary Examiner* — David Phantana Angkool
(74) *Attorney, Agent, or Firm* — Kilpatrick Townsend & Stockton LLP (57) ABSTRACT

A first input is received in an animation creation application having a user interface showing a virtual-space area for first objects, and a timeline area for second objects representing events. To generate the first input, a user presses and holds an input control while a cursor is over one of the first or second objects. It is determined whether the input control is held for at least a predefined duration. If so, a copy of the object is assigned to the cursor, and the copy is subsequently pasted at another location in the user interface upon the input control ceasing to be held after the cursor is moved to the other location. If the input control does not remain held for at least the predefined duration the copy of the object is not assigned to the cursor.

21 Claims, 11 Drawing Sheets

OTHER PUBLICATIONS

'Timeline of Mouse Messages and System Events' [online]. Microsoft, 2011, [retrieved on May 11, 2011]. Retrieved from the internet: <URL: http://msdn.microsoft.com/en-us/library/ms704137(v=VS.85).aspx>.

'Pen' [online]. Microsoft, 2011, [retrieved on May 11, 2011]. Retrieved from the internet: <URL:http://msdn.microsoft.com/en-us/library/cc872775.aspx>.

'Responding to Pen Flicks' Events' [online]. Microsoft, 2011, [retrieved on May 11, 2011]. Retrieved from the internet: <URL: http://msdn.microsoft.com/en-us/library/ms703447(VS.85).aspx>.

'Commanding Overview' [online]. Microsoft, 2011, [retrieved on May 11, 2011]. Retrieved from the internet: <URL: http://msdn.microsoft.com/en-us/library/ms752308.aspx>.

Cao, Xiang et al. 'Recognizing Pen Grips for Natural User Interaction' [online]. Microsoft, 2011, [retrieved on May 11, 2011]. Retrieved from the internet: <URL: http://research.microsoft.com/en-us/projects/pengrip/>.

Hawkins, James. 'Kinect Pen and Paper Soundboard Hack Taps More Kinect Potential' [online]. JoyStick Division, 2011, [retrieved on May 11, 2011]. Retrieved from the internet: <URL: http://www.joystickdivision.com/2011/02/kinect_pen_and_paper_hack_taps.php#>.

'Related Work' [online]. Microsoft, 1996, [retrieved on May 11, 2011]. <URL: http://research.microsoft.com/en-us/um/people/kenh/thesis/previous.htm>.

'How to rearrange icons or move icons from one Home Screen to another on the iPad and iPhone' [online]. Bleeping Computer LLC, 2010, [retrieved on May 11, 2011]. Retrieved from the internet: <URL: http://www.bleepingcomputer.com/tutorials/tutorial170.html>.

'Drag-and-drop' [online] Wikipedia, Wikimedia Foundation, Inc., 2011, [retrieved on May 11, 2011]. Retrieved from the internet: <URL: http://en.wikipedia.org/wiki/Drag_and_drop>.

'Erratic Copy Command' [online]. IPBoard, 2009 [retrieved on Jan. 18, 2011]. Retrieved from the internet: <URL: http://pgmacros.invisionzone.com/index.php?showtopic=4193>.

'ACAD Copy Object in PIW' [online]. vBulletin Solutions, 2011, [retrieved on Jan. 18, 2011]. Retrieved from the internet: <URL: http://www.davetyner.com/forum/showthread.php?666-ACAD-Copy-Object-in-PIW&p=2511>.

'MultiGen Inc. announces SmartModel(TM) technology: revolutionary virtual reality scene builder for Silicon Graphics systems; SmartModel technology lets technical and non-technical users step into cyberspace for a "hands-on" approach to creating 3D scenes.' [online]. The Free Library by Farlex, Inc. 2011, [retrieved on Jan. 18, 2011]. Retrieved from the internet: <URL: http://www.thefreelibrary.com/MultiGen+Inc.+announces+SmartModel(TM)+technology:+revolutionary...a017146497>.

'Kinect-optimized Xbox 360 Dashboard preview' [online]. Engadget, AOL Inc. 2011, [retrieved on Jan. 18, 2011]. Retrieved from the internet: <URL: http://www.engadget.com/2010/06/15/kinect-optimized-xbox-360-dashboard-preview/>.

'iPhone' [online]. Wikipedia, Wikimedia Foundation, Inc., 2008, [retrieved on Jan. 18, 2011]. Retrieved from the internet: <URL: http://web.archive.org/web/20080801083839/http:/en.wikipedia.org/wiki/IPhone>.

Costello, Sam. 'Rearranging the iPad and iPhone Home Screen Icons' [online]. About.com, 2011, [retrieved on Jan. 18, 2011]. Retrieved from the internet: <URL: http://ipod.about.com/od/iphonehowtos/a/iph_home_screen.htm>.

Grover, "Flash CS5: The Missing Manual, Fourth Edition, Chapters 1, 2 and 4", Oct. 25, 2010. Downloaded from the internet at: http://my.safaribooksonline.com/book/web-development/flash/9781449380267 on May 16, 2012, 18 pages.

Toader, International Search Report in corresponding PCT Application No. PCT/US2012/027081 dated Jun. 27, 2012, 11 pages.

* cited by examiner

COPYING AN OBJECT IN AN ANIMATION CREATION APPLICATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This document relates to copying an object in an animation creation application.

BACKGROUND

Animation can be used for at least two different purposes in a moviemaking process. First, when an animated movie or other video content is being generated, the animation is generated to constitute, or otherwise be a part of, the movie itself. For example, animated motion pictures contain one or more computer generated characters that are caused to move, speak, transform or otherwise change shape by the animation. Such characters can represent real human beings, fictitious human beings or fictitious characters, to name a few examples. Actions by the character(s) and/or other events can be staged in a virtual space generated by a computer system, and the video sequence can then be captured using one or more virtual cameras defined for the virtual space.

Another purpose for animation is to simulate or otherwise visually represent one or more events that are intended to later be performed on a physical movie set, for example so that the scene can be captured using a physical camera (e.g., a camera recording on a digital medium or on photosensitive film). The animation can serve as a useful visualization of the real life scene before it is shot, perhaps even before the physical stage is built. This can allow a director or another artist to make changes in the intended scene based on the observed animation, and/or to plan the scene in more detail.

An animation creation application can be used for at least the purposed discussed above. For example, the animation creation application provides that the virtual space can be defined and provided with suitable characters and other assets, wherein the motion or other behavior of the characters, etc., is defined using the application according to the animation that is intended to be created.

SUMMARY

Implementations of the invention provide copying of an object in an animation creation application. In one aspect, implementations provide receiving a first input, the animation creation application having a user interface that shows a virtual-space area for one or more first objects used in animations, and a timeline area for one or more second objects representing events in the animations. The first input is generated by a user pressing and holding an input control of an input device while a cursor controlled by the input device is over one of the first or second objects. The implementations provide, in response to the first input, determining whether the input control is held for at least a predefined duration. If so, a copy of the object is assigned to the cursor, and the copy is subsequently pasted at another location in the user interface upon the input control ceasing to be held after the cursor is moved to the other location. For copies of the first objects the other location is in the virtual-space area, and for copies of the second objects the other location is in the timeline area. If the input control does not remain held for at least the predefined duration the copy of the object is not assigned to the cursor.

The invention can be implemented as a computer-performed method, as a computer program product, and/or as a computer system, to name a few examples.

Implementations can include any or all of the following features. Presenting, in response to the first input, a timer in the user interface that is updated to show a remainder of the predefined duration. Generating visual representation that represents the copy, and associating the visual representation with the cursor for moving the copy in the user interface. The timeline area includes multiple parallel timelines, and the object is located in one of the timelines and wherein the copy is pasted in the same timeline or a different one of the timelines. A gesture generated using the input device terminates a copying procedure that is initiated based on the predefined duration. The object comprises a visual representation and underlying data, the visual representation being generated and associated with the cursor in response to the copy of the object being assigned to the cursor, wherein the underlying data is copied in response to the second input. The object comprises a visual representation and underlying data, the underlying data being copied in response to the copy of the object being assigned to the cursor.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Methods and techniques described herein can be used with one or more animation creation applications. When a user has placed a cursor on a copyable object, an improved approach for copying an object provides that the user can press and hold an input control on an input device for a predetermined duration to automatically initiate the copy operation. In contrast, if before the end of the predetermined duration the user releases the input control and/or moves the cursor off the object, the copy operation is not initiated. When the input device is a mouse, for example, the user can press and hold the left mouse button to automatically copy the object. In other implementations, the animation creation application can be implemented so that user input is only or mainly supported by way of a stylus, as opposed to, say, using a mouse and/or keyboard. In such and other situations, the user can make the copy command by pressing and holding a tip of the stylus toward a corresponding tablet or other surface. If the stylus tip remains pressed and the cursor remains on the object by the predetermined time, the object is automatically copied. Accordingly, in the above examples, the user can conveniently make a copy without releasing the mouse or stylus.

Figure 1:
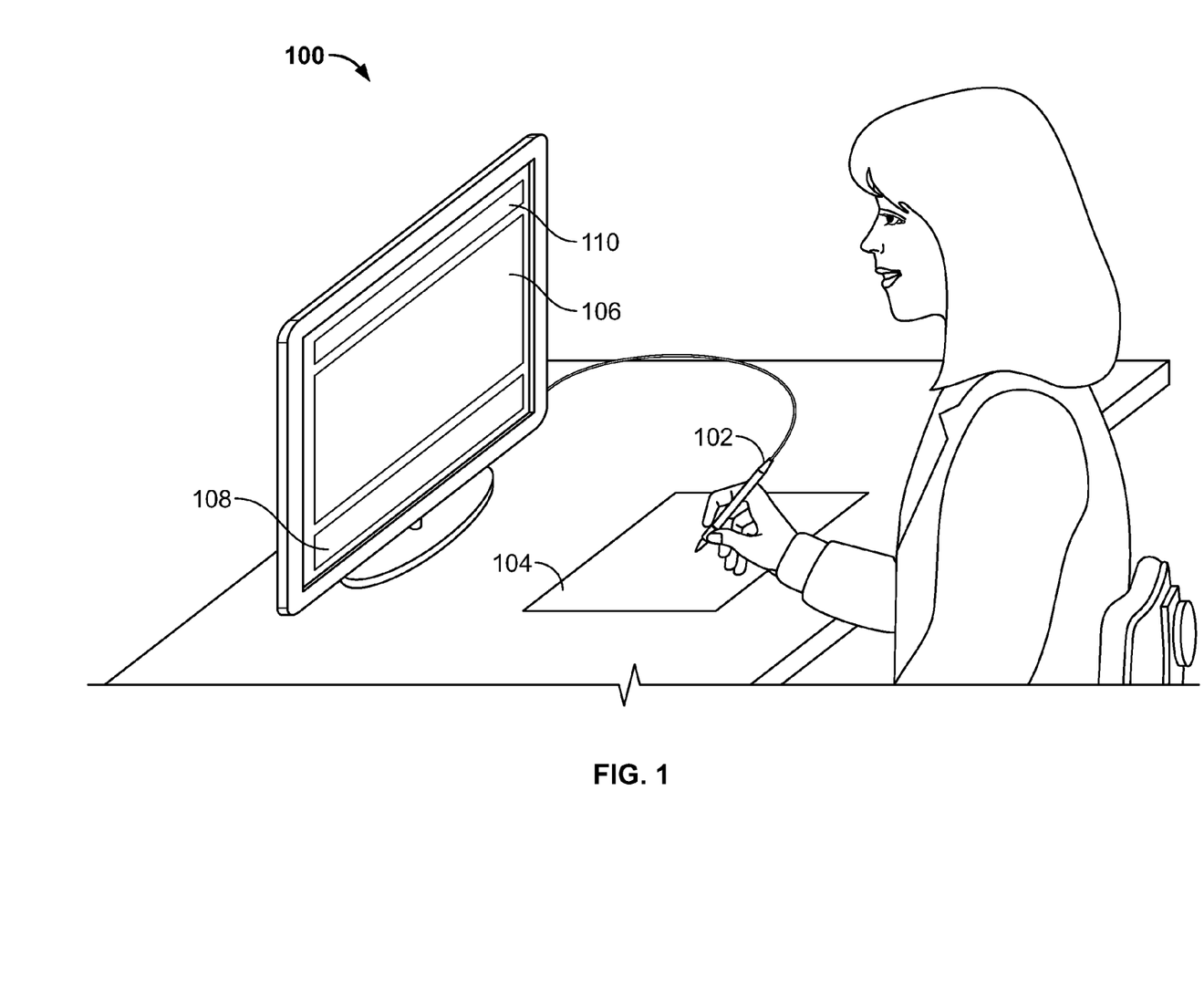
FIG. 1 shows an elevation view of a user operating an animation creation application using a stylus and a tablet.

FIG. 1 shows an elevation view of a user operating an animation creation application 100 using an input device. In this example, the input device includes a stylus 102 and a tablet 104. In some implementations, the input device is configured so that the user can point to one or more objects or other items at arbitrary locations in the animation creation application 100, and make one or more inputs to the application. For example, the current relative position between the stylus 102 and the tablet 104 defines at least one logical coordinate, and the application can use such a coordinate as an argument for one or more operations or other functions. For example, the user can employ the stylus 102 and tablet 104 to issue commands or other instructions to the application; to select, move or otherwise manipulate a character or other object; and to initiate one or more operations other than by the animation creation application, such as by the operating system or another application.

The animation creation application 100 here generates a virtual-space area 106 for one or more objects used in animations. In some implementations, the virtual-space area 106 presents a virtual environment that represents an existing physical space (e.g., a city), or a fictitious space (e.g., an alien spaceship), or both. The objects in the virtual-space area 106 can correspond to characters, tangible items, intangible items, environment, position marks, motion marks, forces, or energy, to name just a few examples.

The user can employ the animation creation application 100 to define a motion or other event involving any object in the virtual-space area 106. The temporal aspects of the motion or event can be schematically represented in a timeline area 108. For example, each character or object can have one or more individual timelines in the timeline area 108 and the motion or event can be marked in the timeline(s) to inform the user about the existence and duration thereof. The user can record the individual video frames for the animation at consecutive instances during the motion or event, by a virtual camera defined by the animation creation application 100. For example, a toolbar area 110 can make various tools, controls and other interfaces available to the user, and the user can activate or otherwise select the desired item using the input device, such as the stylus 102 and the tablet 104. When the animation creation application 100 plays the animation, the motion or event appears in the virtual-space area 106. Simultaneously, the timeline area 108 can be continuously updated to show the progress of the animation.

Figure 2:
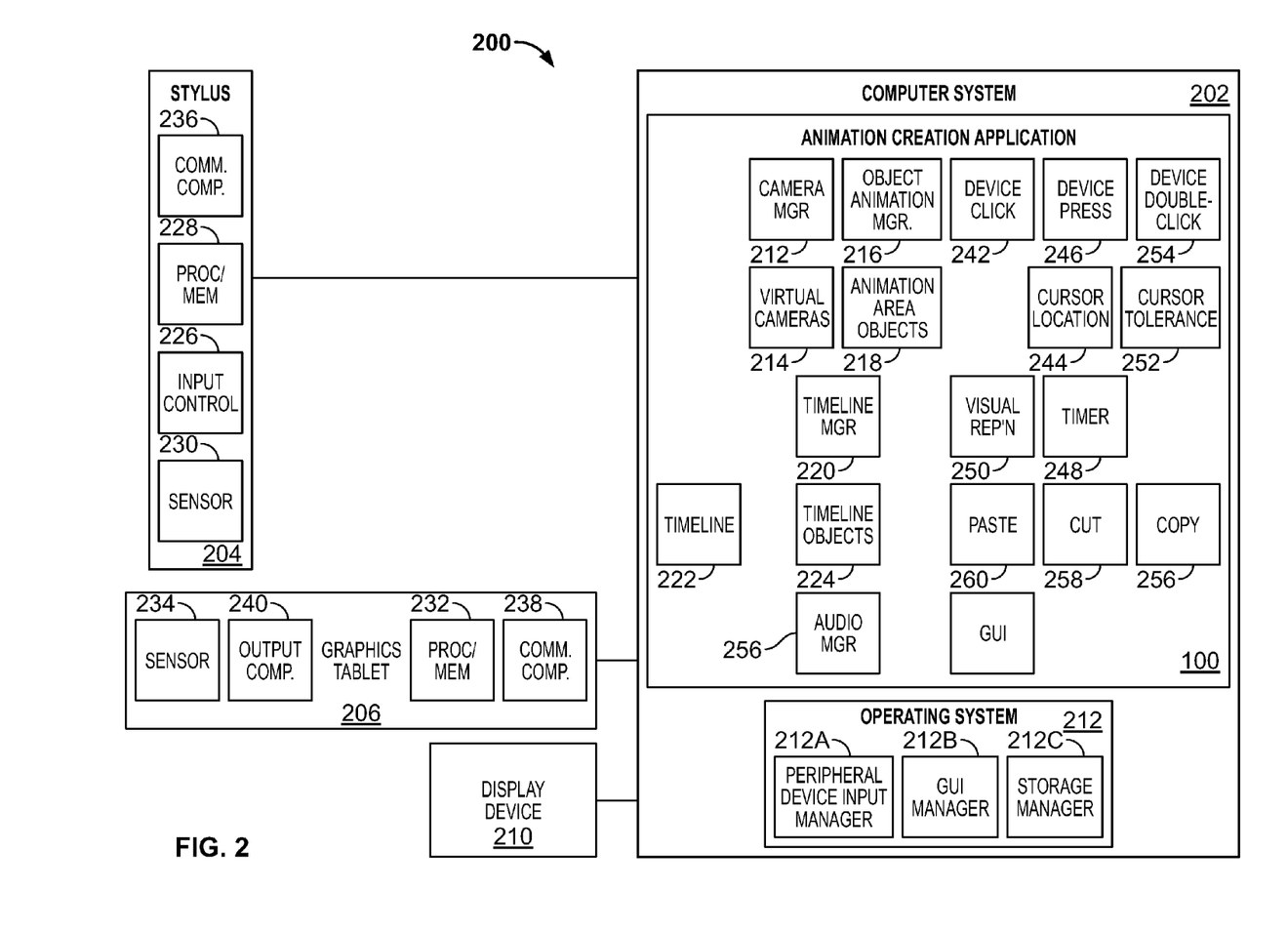
FIG. 2 shows a block diagram of a system in which the animation creation application of FIG. 1 can be used for creating animations.

FIG. 2 shows a block diagram of a system 200 in which the animation creation application 100 of FIG. 1 can be used for creating animations. In short, the system 200 includes a computer system 202 (e.g., a server, cloud computer, personal computer, laptop or other mobile device), and a stylus 204, a graphics tablet 206 and a display device 210 connected to the computer system 202. For example, the stylus 204 and graphics tablet 206 can correspond to the stylus 102 (FIG. 1) and tablet 104 (FIG. 1), respectively. In other implementations, another input device than the stylus 204 can be used, for example a mouse.

The computer system 202 has stored therein code or other executable instructions for generating the animation creation application 100 and an operating system 212. The code/instructions can be written in any suitable programming language and can be stored in one or more types of storage device, such as a memory or drive unit(s). For example, the operating system 212 can include, but is not limited to, an input manager 212A for peripheral devices (e.g., the stylus 204 and graphics tablet 206, or a mouse), a GUI manager 212B (e.g., to generate and update a screen with content output by the animation creation application 100), and a storage manager 212C (e.g., to store executable code and other resources, and allocate available space in memory, drives and other storage.)

Details regarding the system 200 will be discussed in connection with the following examples, which will be described with reference also to the earlier figures. FIGS. 3A-E show example screens of the animation creation application 100 of FIG. 1. Here, a screen 300 shows partial views of each of the virtual-space area 106 and the timeline area 108. The timeline area 108 includes multiple timelines 302, in this example a timeline 302A for a virtual camera, a timeline 302B for the performance (e.g., motion or transformation) of a particular character, and a timeline 302C for the position of the same character. In some implementations, one or more other or additional timelines can be used. For example, an audio manager 256 (FIG. 2) can associate one or more audio tracks or audio effects with the animation, and the presence, absence or composition of audio content in the temporal domain can be indicated by one of the timelines.

Figure 3A:
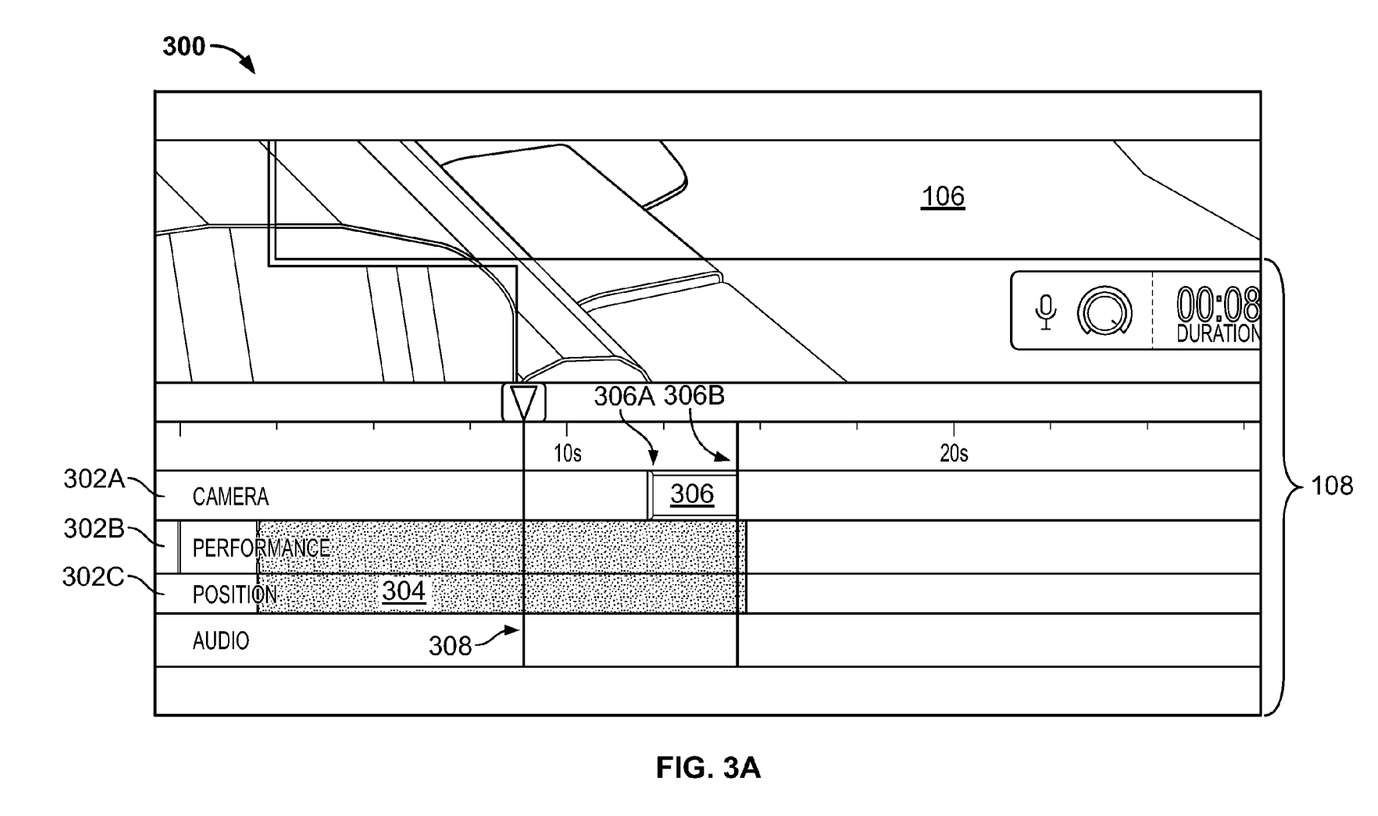
FIGS. 3A-E show example screens of the animation creation application of FIG. 1.

When the virtual space involves more than one character, additional timeline(s) can be used accordingly. For example, one or more characters can be given "focus" in the virtual-space area 106, such as by selecting the character(s), and the timelines for the character(s) in focus will be presented in the timeline area 108.

Here, the timeline 302C has defined therein an object 304 that relates to the character's position. In some implementations, the presence of the object 304 in the timeline indicates that the character is moving within the virtual space during the corresponding time. This motion can be defined by the user and can be modified if necessary, for example to make the motion slower or faster, or to make the character traverse a different path. The character or object is controlled by an object animation manager 216 in the animation creation application 100. The object animation manager 216 can control any and all of multiple animation area objects 218.

In addition, the timeline 302A has an object 306 defined therein. The object 306 indicates one or more logical parameters regarding the virtual camera. For example, here the object 306 corresponds to a "hold", which is a region of time where the virtual camera remains in a fixed position and orientation. In some implementations, a hold occurs whenever two consecutive keys (e.g., a first object 306A and a second object 306B) contain identical values. The virtual camera is defined and operated by a camera manager 212 in the animation creation application 100. The camera manager 212 can define and control any and all of multiple virtual cameras 214. Particularly, the object 306 is here defined between the first object 306A and the second object 306B.

The timelines 302 include a play head indicator 308 that visualizes the current temporal position in the duration of the animation. When the animation is being played, the play head indicator moves accordingly along the timelines 302.

The timelines 302 are defined and controlled by a timeline manager 220, which can define and control any and all of multiple timelines 222. Particularly, one or more of the timelines can be provided with a timeline object 224 (e.g., the objects 304 and 306).

Figure 3B:
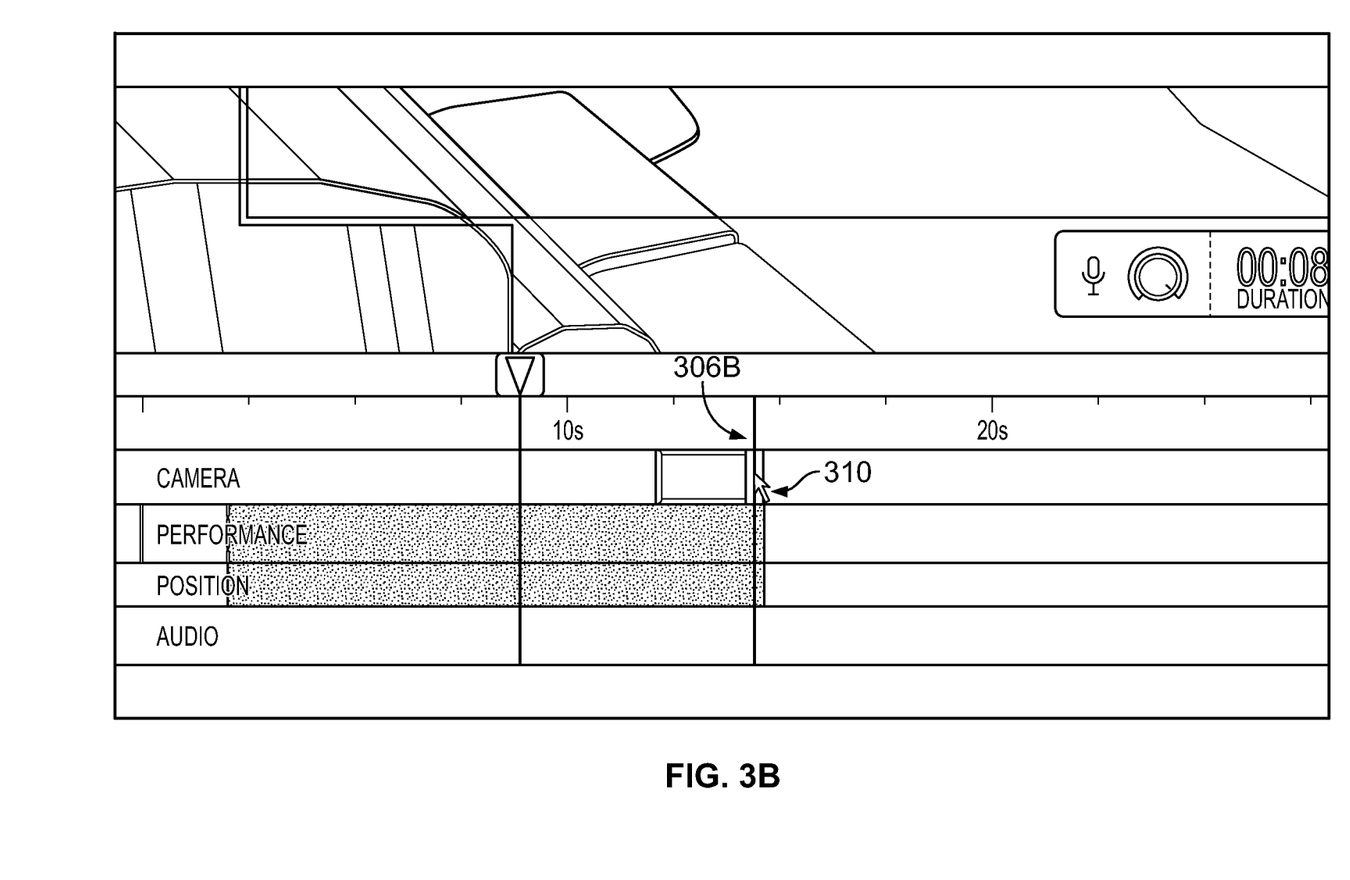

Assume now that the user wishes to create another object like the object 306B in the timeline 302A. With reference now also to FIG. 3B, the user places a cursor 310 on the object 306B using the stylus 204 or another input device, and presses and holds an input control. For example, the user presses and holds the tip of the stylus against the tablet 206 while the cursor is on the object 306B. In some implementations, the button can be included in an input control 226 on the stylus 204.

The cursor's location on the screen is here defined by the position of the stylus 204 relative to the graphics tablet 206. In some implementations, a processor and memory 228 in the stylus 204 operates a sensor 230 that defines unique positions (e.g., xy-coordinates) with regard to the graphics tablet 206. In some implementations, the graphics tablet 206 is provided with a processor and memory 232 that operates a sensor 234 and thereby defines the location. Any suitable sensing technology can be used, including, but not limited to, electromagnetic signal sensing, optical sensing, capacitive sensing, acoustic sensing, and combinations thereof. The current position of the cursor is provided to the computer system 202 by a communication component 236 in the stylus and/or by a communication component 238 in the graphics tablet. In some implementations, the graphics tablet includes an output component 240, such as a display device or other visual indicating device that can aid the user's operation of the stylus.

In some implementations, the input control 226 registers that the user presses and holds the stylus tip, for example against the tablet. In other implementations, the input control 226 registers that the user presses and holds a mouse button.

When the computer device 202 receives the input(s) corresponding to (i) the user placing the cursor 310 on the object 306B, and (ii) the user pressing and holding the input control 226, a countdown timer operation is initiated. Particularly, a device click function 242 can register that the user has clicked the button, for example on the stylus. Using a cursor location function 244, the animation creation application 100 determines that the cursor 310 is currently placed on a selectable object (i.e., the object 306B in this example). Thus, the computer system 202 registers a selection of the object 306B. In this example, the object 306B is highlighted (i.e., widened) based on the selection, as a visual feedback to the user.

A device press function 246 registers that the user is pressing and holding the input control 226, such as the stylus tip or mouse button. For example, the input control 226 can trigger a continuous or repetitive output from the communication component 236 or 238 to indicate that the stylus or button is being pressed and held. The pressing of the stylus triggers a timer 248 to start counting down for a predetermined time. In some implementations, the countdown is object specific and may be different for the object 306B than, say, one or more of the other objects in the timelines 302.

Figure 3C:
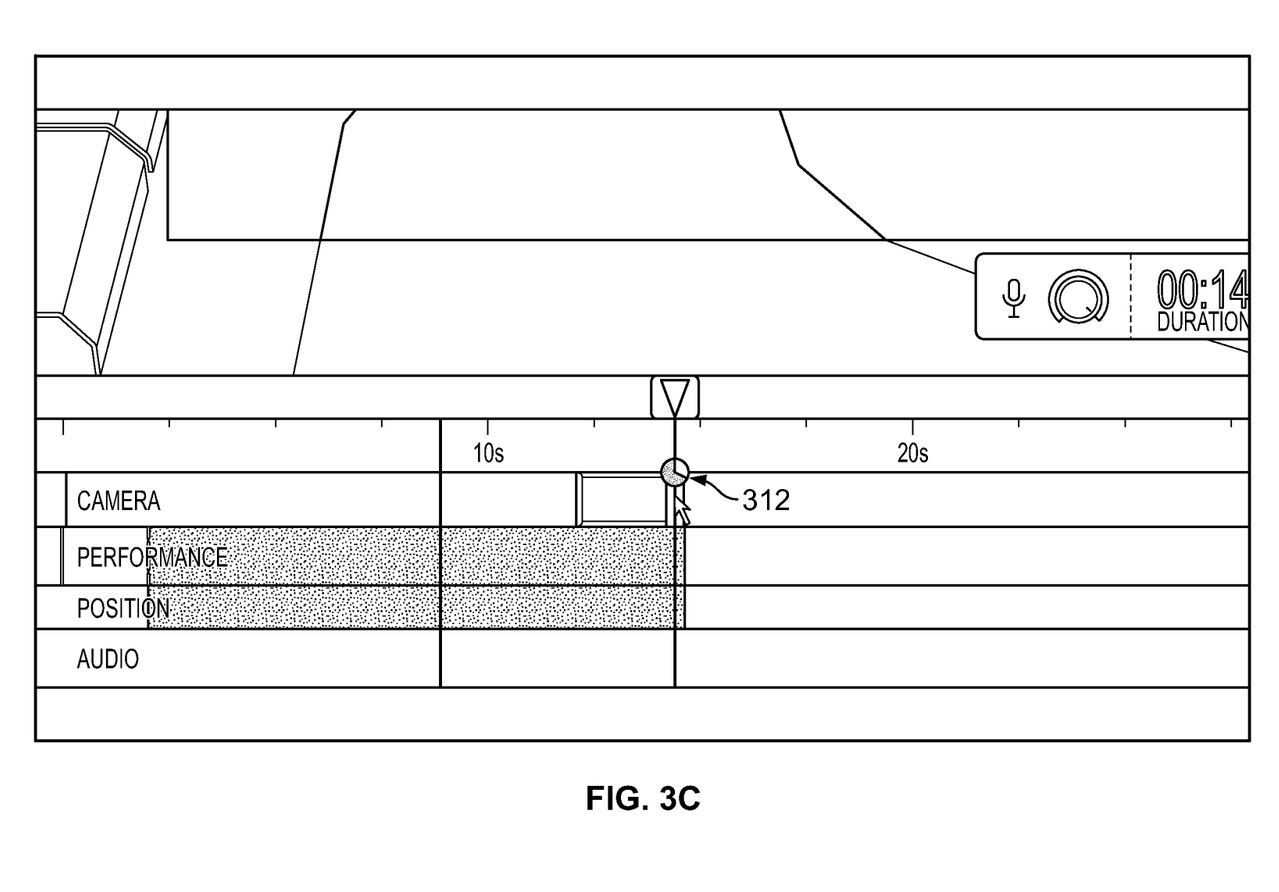

As illustrated in FIG. 3C, a visual countdown indicator 312 can begin to be displayed based on the timer 248. The visual countdown indicator 312 can be generated based on a visual representation function 250 associated with the timer 248. In this example, the visual countdown indicator 312 includes a circular dial where a circle segment increases or decreases to signify the passing of time.

The countdown timer can be prematurely terminated by a predefined event. In some implementations, the countdown is interrupted if the user moves the cursor off the object 306B— e.g., as registered by a cursor tolerance function 252. As another example, if the user clicks the stylus button—e.g., as registered by the device click function 242 and/or a device double-click function 254, this can also cause the countdown timer to be terminated. Termination of the countdown timer signifies that no action associated with the countdown will automatically be taken. In some implementations, the visual countdown indicator 312 and the timer 248 run for about two seconds unless terminated prematurely. Other predefined durations can be used, including, but not limited to, durations defined by a user-controlled variable.

On the other hand, if the user continues to press the stylus tip or the mouse button until the end of the predefined duration, a function is automatically executed. In this example, a copy function 256 is activated regarding the object 306B upon the stylus button remaining pressed for the predefined duration. In other examples, another function can instead or also be activated, including, but not limited to, a cut function 258 or a paste function 260.

Figure 3D:
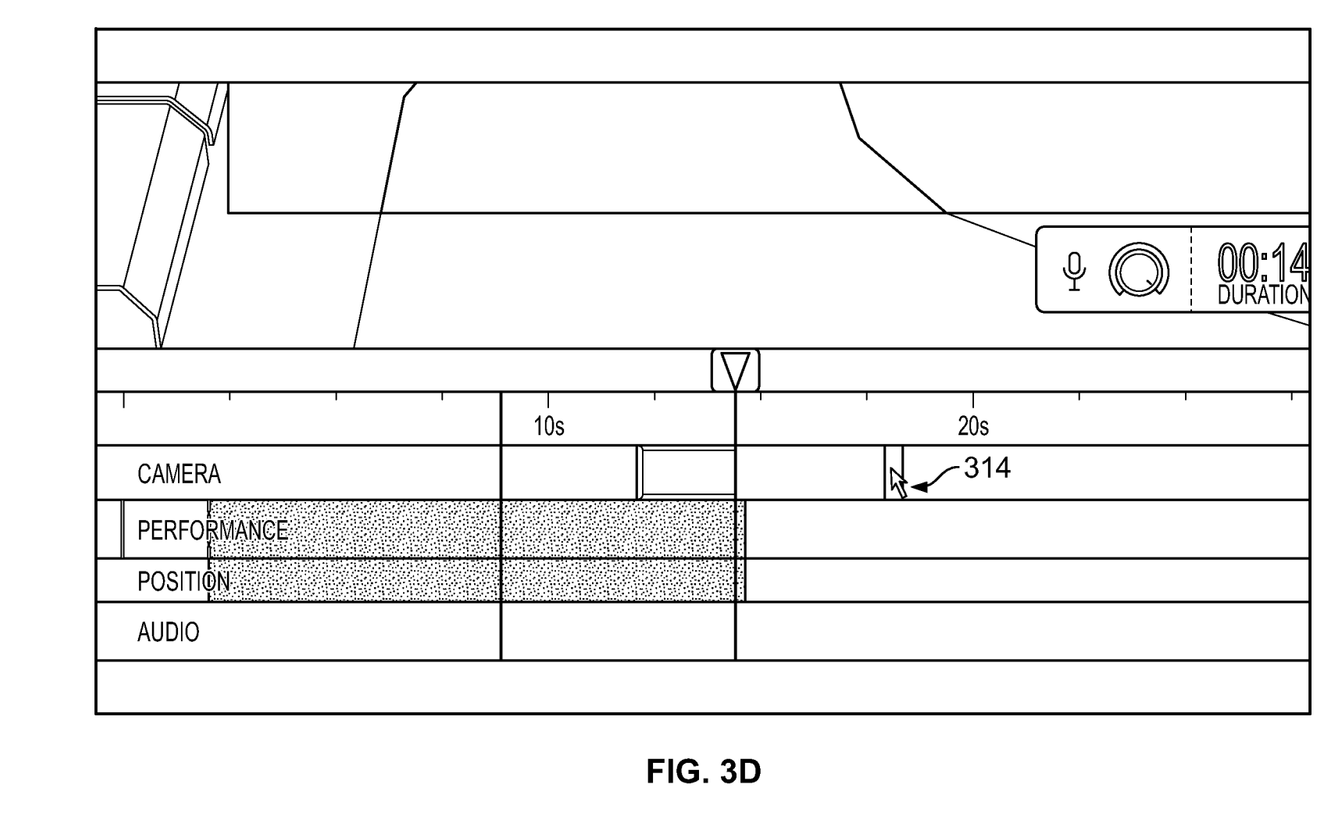

As illustrated in FIG. 3D, the activation of the copy function 256 causes a copy 314 of the object 306B to be assigned to the cursor. For clarity, the copy 314 is shown in another location of the timeline, after the user has moved the cursor away from the object 306B using the stylus. In some implementations, the user can move the cursor to any other location in the timelines 302. In this particular example, the user continues to press and hold the input control 226 while the cursor and the copy 314 are being moved to the other location—an arbitrary position elsewhere in the user interface.

The user ceases to hold the input control when the cursor is at the other location. For example, the user stops pressing the stylus against the tablet, or releases the mouse button. The ceased holding of the input control is communicated to the computer system 202 by the communication component 236 and/or 238, and indicates that the copy should be pasted at the current location of the cursor. In some implementations, the ceased pressing is registered as an interruption of a continuous or otherwise regularly generated signal from the input control 226. In other implementations, ceasing to press the input control generates a special signal that signifies a release of the stylus tip or mouse button.

If, when the user ceases to press the input control, the current cursor location is a place where the copy 314 can be pasted, the ceased pressing will trigger performance of the paste function 260. That is, the animation creation application 100 may define different areas of the user interface (e.g., the areas 106 or 108 in FIG. 1) as valid or invalid target locations for the paste function 260. In some implementations, an object copied or cut from somewhere on the timelines 302 may be validly pasted at any other location on the timelines 302, but not in the virtual-space area 106, and vice versa. In other implementations, one or more restrictions can be applied, including, but not limited to, that a timeline object can be pasted only within the same timeline or within another timeline of the same type. For example, an object from the timeline 302A can be pasted only in a timeline relating to a virtual camera, or an object relating to character performance or motion can be pasted only in a corresponding timeline.

Figure 3E:
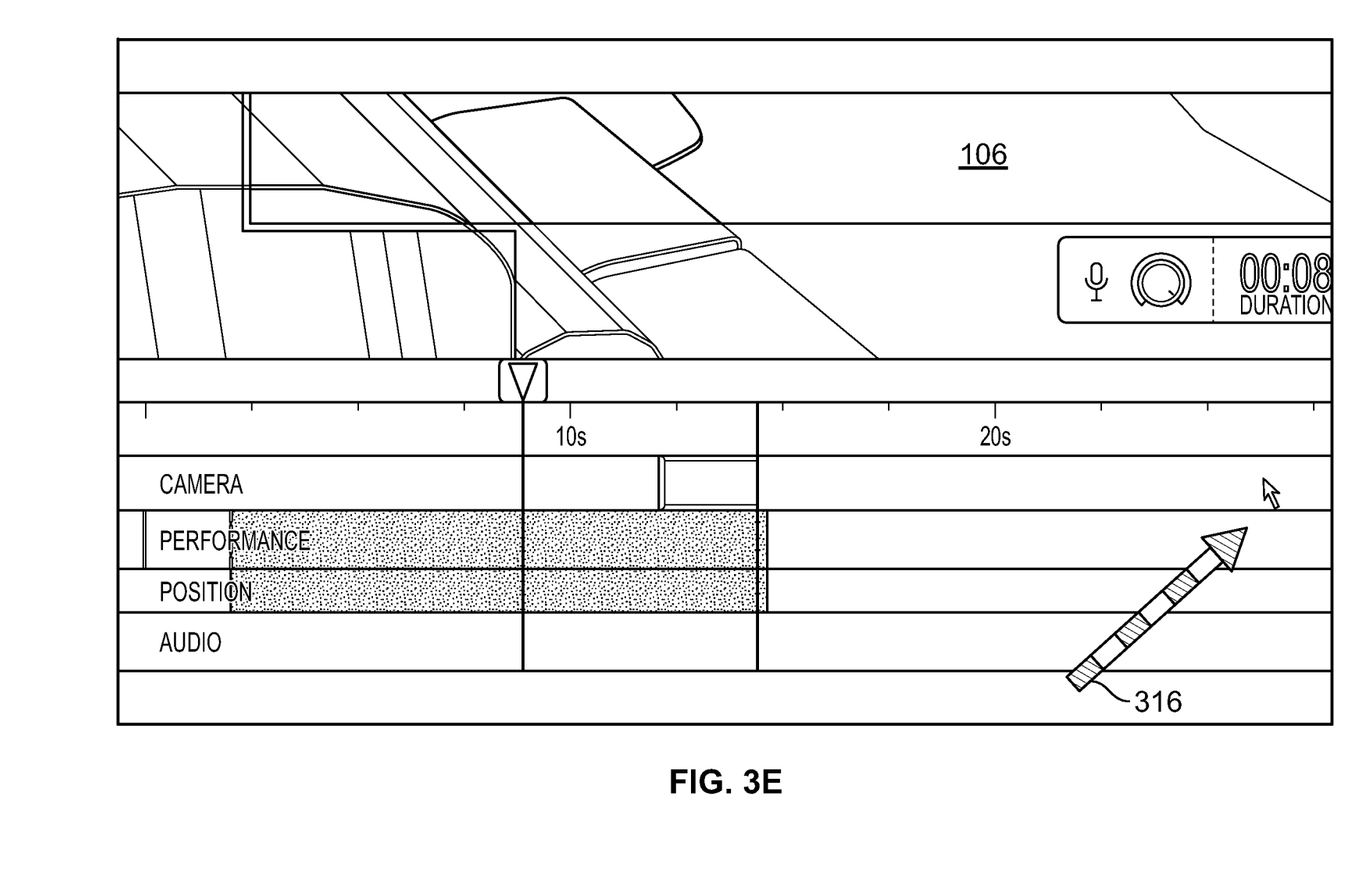

Assume now, instead, that the user changed his or her mind after the copy 314 was assigned to the cursor. Rather than cease pressing the input control, which would initiate the paste function 260 (assuming that the pasting would be valid), the user can make a gesture or other motion using the input device to indicate that the copying procedure should be terminated. In some implementations, the user makes a flicking motion with the stylus 102 (FIG. 1) or with a mouse. For example, the flicking motion can cause the cursor to move on the screen, as schematically illustrated in FIG. 3E by an arrow 316. The flicking motion can be a linear or non-linear motion, including, but not limited to, an arc motion, a wave-shaped motion, a zigzag motion, and combinations thereof, to name just a few examples. In response to the input generated by the gesture, the animation creation application 100 terminates the copying procedure. For example, the copy 314 can be disassociated from the cursor. In implementations where underlying data is copied at the time when the copy is assigned (i.e., before the user ceases to press the input control), such copying can be voided or interrupted based on the gesture.

In some implementations, the animation creation application 100 recognizes the gesture as terminating the copying procedure only if the gesture is directed toward a predefined area on the screen. For example, one or more positions in the virtual-space area 106 (FIG. 1) and/or timeline area 108 (FIG. 1) can be defined as termination areas, and if the user flicks the cursor toward the termination area after the copy has been assigned to the cursor, the animation creation application 100 can interpret this as a request to disassociate the copy from the cursor without pasting the copy.

Figure 4A:
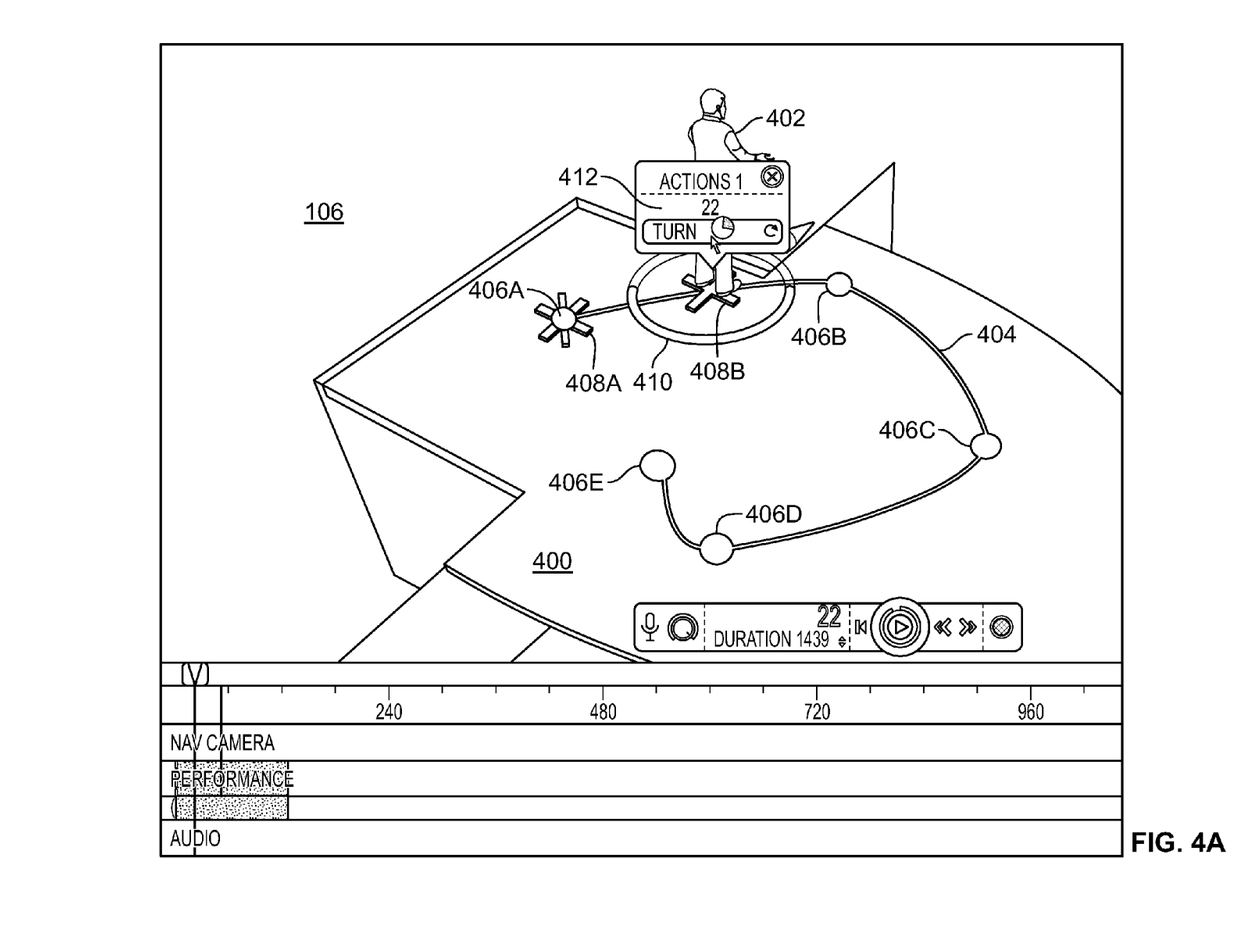
FIGS. 4A-B show other example screens of the animation creation application of FIG. 1.
Figure 4B:
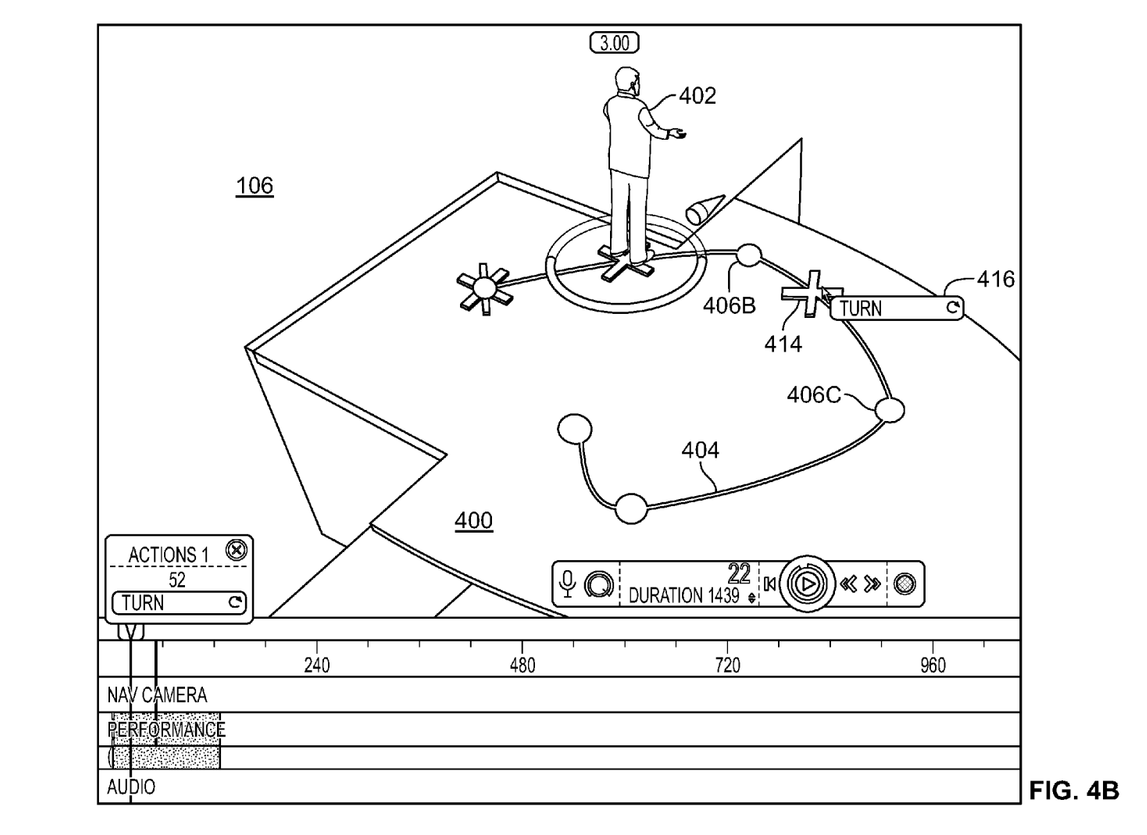

FIGS. 4A-B show other example screens of the animation creation application of FIG. 1. In these examples, a copy action will be initiated and performed in the virtual-space area 106. The general operation of this area will first be described. The virtual-space area 106 has defined therein a virtual space that in this implementation contains an environment 400. For example, the environment 400 represents an outdoor or indoor space and can be used in generating one or more animations. Here, the environment 400 includes a surface that is essentially horizontal.

A character 402 is currently located in the environment 400, and this character will undergo relocation and/or other changes as part of generating the animation. The character 402 has a torso with two arms, two legs and a head. In various examples, the character 402 can represent a human being or other primate, a robot, an alien character, or combinations thereof.

A path 404 has been defined for the character 402 in the environment 400. The path 404 conceptually illustrates the defined motion of the character 402 in the environment 400. For example, the character 402 can walk, run, crawl, slide, or fly along some distance, as defined by the path 404. A different motion can be created by modifying the path 404 and/or by generating a new path.

One or more types of markers can be used in the environment 400. Here, markers 406A-E have generally rounded shapes (e.g., circular or semispherical) and correspond to a first type of marker that can be placed in one or more locations on the path 404. For example, each of the markers 406A-E can signify that the character 402 stops along the path 404 for an arbitrary period of time. In some implementations, the path 402 can be defined based at least in part on the markers 406A-E, for example in that the markers 406A and 406E form two endpoints of the path 404.

Markers 408A-B, in turn, are generally shaped like plus signs or crosses. Each of the markers 408A-B represents a partial or full turn by the character 402 while being stationary on, or traveling along, the path 404. For example, the marker 408A essentially coincides with the marker 406A, and in some implementations this signifies that the character 402 will perform a turn while standing at that endpoint of the path 404. That is, assuming that the marker 406A represents the beginning of the character's movement along the path 404 and the marker 406E represents the end, then the marker 408A defines that the character 402 is programmed to make a turn before the movement.

Similarly, the marker 408B represents that the character performs a full or partial turn between the markers 406A and 406B on the path 404. For example, the turn can be done as the character is traveling; i.e., while the character is in motion. The marker 408B has been selected by the user in this example, and this triggers display of some additional information. First, an arc 410 is displayed in association with the marker 408B. In some implementations, the arc 410 indicates the extent of the turn, for example by the arc 410 having a solid outline and a remainder of the circle being indicated in phantom. The arc 410 can be modified to indicate a smaller or larger turn.

Second, a pane 412 is displayed in association with the marker 408B when, as here, the user presses and holds an input control (e.g., a stylus tip or a mouse button) while the cursor is on the marker 408B. The pane 412 includes information about the turn that the marker 408B represents. Particularly, the pane 412 represents a countdown timer that beings counting when it is detected that the user presses and holds the input control (e.g., the stylus tip or the mouse button). In some implementations, the pane 412 can be generated based on the visual representation function 250 (FIG. 2) and can be based on the timer 248 (FIG. 2).

If the user moves the cursor off the marker 408B before the end of the predetermined time, or if the user ceases to hold the input control, then no copying action is automatically performed and the pane 412 may be removed.

On the other hand, if the cursor remains on the marker 408B and the user keeps holding the pressed input control (e.g., the stylus tip or the mouse button) throughout the predetermined time, then an operation is automatically performed. In some implementations, the copy action 256 (FIG. 2) is automatically performed.

As a result of the copy action, a copy of the selected marker (e.g., here the marker 408B) is generated. The user can paste the copy in any location that is a valid target for the type of the copied object. Here, the user pastes the copy in another position of the path 404, as will now be described.

FIG. 4B shows the environment 400 in the virtual-space 106 after the user has pasted the copy of the selected marker 408B. The copy is here represented by a marker 414 which has been placed between the existing markers 406B and 406C. For example, while continuing to press the input control (e.g., the stylus tip or the mouse button), the user moves the cursor to the desired location on the path 404. When the cursor is on the path 404 at that location, or within a predefined distance of the path as regulated by the cursor tolerance function 252 (FIG. 2), the user can release the input control. For example, the user stops pressing the stylus tip toward the surface, or ceases to press the mouse button. In response, the copy is pasted into the selected location, as here indicated by the marker 414 being displayed there. The marker 414 can have a pane 416 associated therewith, for example to indicate that the marker 414 represents a turn operation and/or to present any other read-only or editable parameters regarding the copied marker.

In some implementations, the turn represented by the marker 414 inherits some or all settings of the marker 408B from which it was copied. The user can then edit the pasted turn in one or more ways to make it different than the original turn, for example by shortening or lengthening the extent of the turn; changing the orientation that the character 402 has when the turn begins; and/or by making the pasted turn be faster or slower than the original turn.

In this example, the result of the copy and paste operations is that the animation will show the character 402 making at least three turns instead of one. That is, before the copying the character 402 was scheduled to turn only at the markers 408A and 408B, but now the character will perform at least one additional turn defined by the marker 414.

Figures 5, 6:
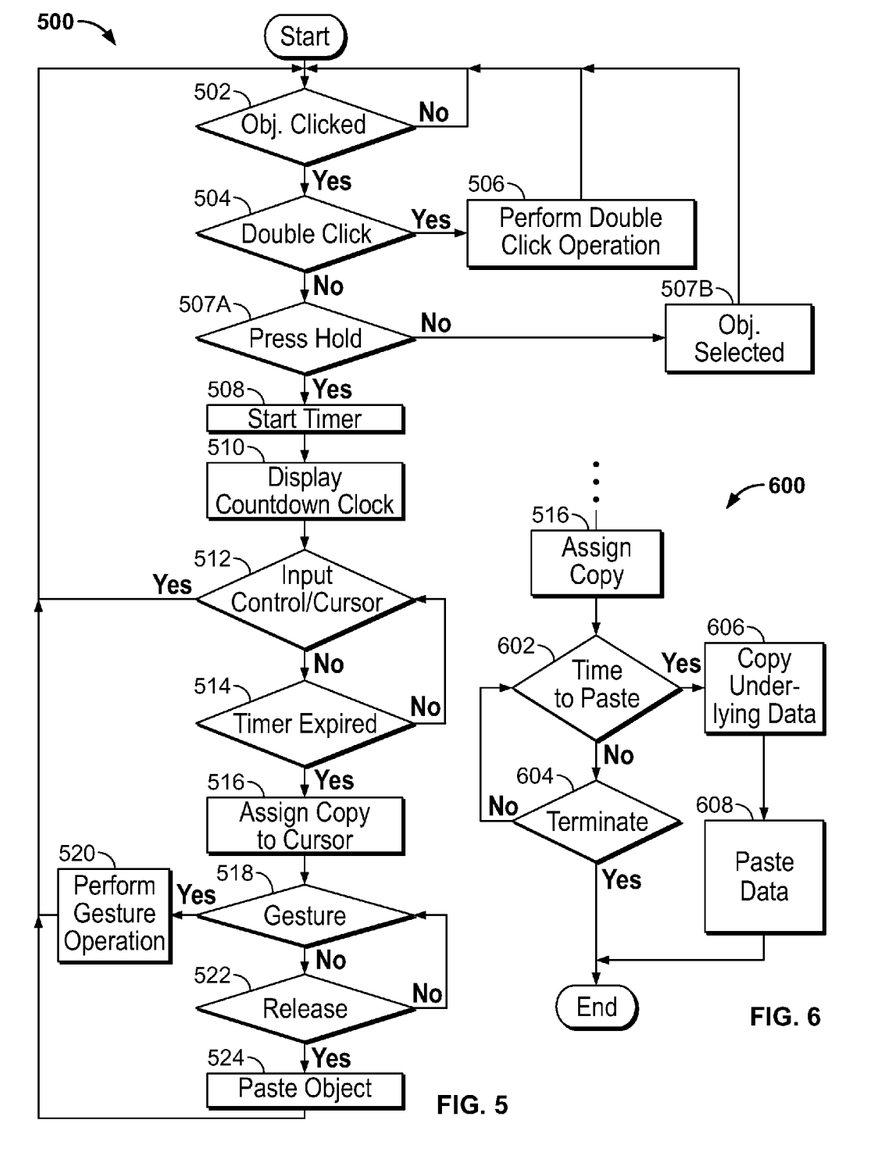
FIG. 5 shows a flowchart of an example method.
FIG. 6 shows an example detail of the method in FIG. 5.

FIG. 5 shows a flowchart of an example method 500. The method 500 can be performed by a processor executing instructions stored in a computer readable medium, for example in the computer system 102 (FIG. 2). At 502, a determination is made whether the user has clicked on an object using the stylus or other input device. For example, the device click function 202 (FIG. 2) can be used. If no click is detected, the method 500 can return.

On the other hand, if the user has clicked on an object at 502, then it is determined at 504 whether it was a double click (e.g., whether two clicks were made within a predefined time interval of each other). For example, the device double-click function 254 (FIG. 2) can be used. If a double click has been detected, then one or more corresponding double click operations are performed at 506.

In contrast, if the detected click was not a double click, then it is determined at 507A whether the user is pressing and holding the input control. For example, the user can press and hold the stylus tip against a surface (e.g., a tablet), or press and hold a button on a mouse or any other form of input device. If the user is not pressing and holding the input control at 507A, then the click detected at 502 may result in one or more other actions being performed. For example, at 507B the object can be recognized as selected, such as by highlighting the object or changing its appearance in another way.

On the other hand, if the user is pressing and holding the input control at 507A, then a timer is started at 508. For example, the timer 248 (FIG. 2) can be used. At 510, a countdown clock can be displayed to the user while the timer is counting down. For example, the visual representation 250 (FIG. 2) can be used for generating the visual countdown indicator 312 (FIG. 3C)

At 512, an input-control and cursor check is performed. In one aspect of this check, it is determined whether the user has ceased pressing the stylus tip or released the mouse button. In some implementations, this can be done using the device press function 246 (FIG. 2). For example, when holding the stylus tip (or the mouse button) generates a continuous or periodic input signal (e.g., forwarded by the communication component 236 (FIG. 2) to the computer system 102 (FIG. 2), then the termination or interruption of such signal can indicate that the input control has been released. As another example, releasing the input control (e.g., input control 226 in FIG. 2) can cause a separate signal to be sent that indicates the release. If the user has released the input control at 512, the method 500 can return to 502, for example.

In another aspect of the check at 512, it is determined whether the user has moved the cursor away from the object. This can be determined based on the current cursor location 244 (FIG. 2) using the cursor tolerance 252 (FIG. 2). If the user has moved the cursor away from the object at 512, the method 500 can return to 502, for example.

On the other hand, if at 512 the cursor has not been moved away from the object and the user continues to press the input control, then it is determined at 514 whether the timer has expired. If not, the method 500 can return to 512, for example.

In contrast, if the timer has expired at 514, then a copy of the object is assigned to the cursor at 516. For example, the copy function 256 (FIG. 2) can be used. Some specific examples of copying are described with reference to the next figure.

At 518, the method 500 determines whether the user makes a gesture. For example, a flicking motion with the input device (optionally toward a predefined screen area) can be recognized as a flicking gesture. If the gesture has been performed, a gesture operation can be performed at 520. For example, the copying procedure can be terminated and the copy can be disassociated from the cursor.

In contrast, if the gesture has not been performed at 518, then at 522 it is determined whether the user releases the input control while the cursor has the copy assigned to it. If the user continues to press and hold the input control at 522, the method 500 can return to 518, for example.

On the other hand, if the user has ceased to press and hold the input control at 522, then the copy of the object is pasted at 524. The copy assigned to the cursor includes at least two things: underlying data and visual indicator for the underlying data. For example, the copy 314 in FIG. 3D represents that a new marker has been generated and that the underlying data has been, or will be, copied and applied to the new location.

The pasting operation can handle the underlying data and the visual indicator differently. The visual indicator is generated and attached to the cursor when the copying action is triggered. In some implementations, the underlying data is copied (e.g., to a buffer or other temporary location) essentially when the countdown timer expires. For example, this implies that the underlying data is copied before the user has specified the target (or pasting) location, if any. As a result, an evaluation of pasting validity is possibly performed at each point of the screen to which, or over which, the user moves the cursor with the attached visual indicator.

In other implementations, however, the underlying data is copied only after the user has selected a target location. FIG. 6 shows an example detail of the method in FIG. 5. Here, a method 600 can partially overlap with the method 500 (FIG. 5), but with some differences, for example as will now be described. The copy can be assigned to the cursor at 516, similar to the description above. That is, assigning the copy is here separate from the act of making the copy. Rather, at 516, the visual indicator is generated and attached to the cursor, with the underlying data not being copied at this moment.

At 602, the method 600 determines whether it is time to paste the copy of the object. For example, this can occur when the user ceases to press and hold the input control at another location on the screen. If it is not yet time to paste the copy, and the method should not be terminated (determined at 604), then the method can return to 602, for example.

In contrast, if it is time to paste at 602, then the method can copy the underlying data at 606 (i.e., after the user specifies a target location), and can paste the underlying data at 608. At or around this moment, the visual representation can be disassociated from the cursor and instead be placed at the user-selected location. For example, pasting the copy 314 (FIG. 3D) can involve placing the generated new marker at the chosen location and copying the underlying data corresponding to this timeline object.

After 608, or after 604, the method can end.

Figure 7:
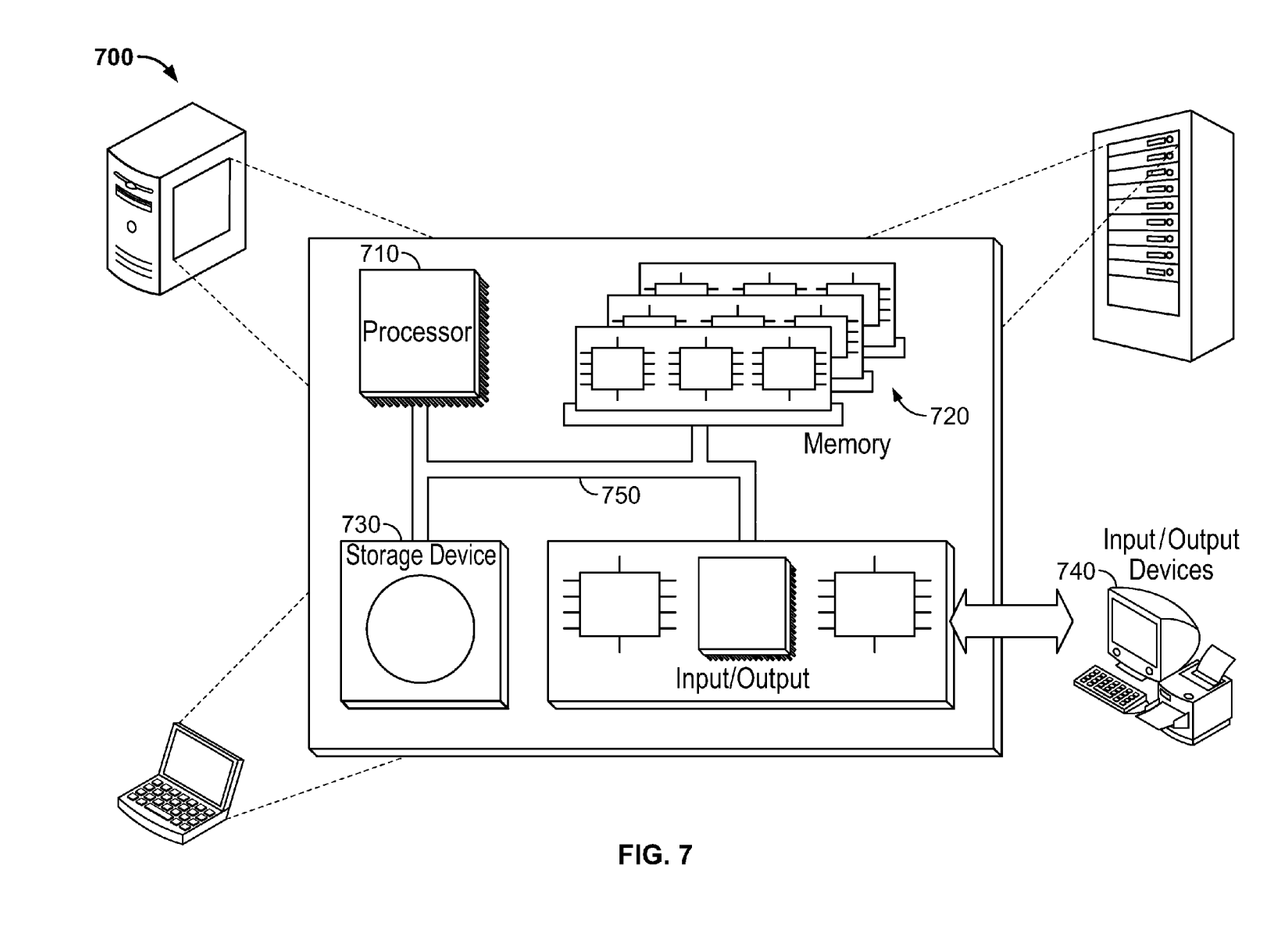
FIG. 7 is a block diagram of a computing system that can be used in connection with computer-implemented methods described in this document.

FIG. 7 is a schematic diagram of a generic computer system 700. The system 700 can be used for the operations described in association with any of the computer-implement methods described previously, according to one implementation. The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In some implementations, the memory 720 is a computer-readable medium. The memory 720 is a volatile memory unit in some implementations and is a non-volatile memory unit in other implementations.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In some implementations, the input/output device 740 can include a mouse or other user-operated pointing device that can serve essentially the same or similar functions as the stylus and tablet described in various examples above. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method for copying an object in an animation creation application, the method comprising:
   receiving a first input to the animation creation application, the animation creation application having a user interface that shows a virtual-space area for one or more first objects used in animations, and a timeline area for one or more second objects representing events in the animations, the first input generated by a user pressing and holding an input control of an input device while a cursor controlled by the input device is over one of the first or second objects;
   in response to the first input, determining whether the input control is held for at least a predefined duration; and
   if so, assigning a copy of the object to the cursor, and subsequently pasting the copy at another location in the user interface upon the input control ceasing to be held after the cursor is moved to the other location, wherein for copies of the first objects the other location is in the virtual-space area, and wherein for copies of the second objects the other location is in the timeline area;
   wherein if the input control does not remain held for at least the predefined duration the copy of the object is not assigned to the cursor.

2. The computer-implemented method of claim 1, further comprising presenting, in response to the first input, a timer in the user interface that is updated to show a remainder of the predefined duration.

3. The computer-implemented method of claim 1, further comprising generating a visual representation that represents the copy, and associating the visual representation with the cursor for moving the copy in the user interface.

4. The computer-implemented method of claim 1, wherein the timeline area includes multiple parallel timelines, and wherein the object is located in one of the timelines and wherein the copy is pasted in the same timeline or a different one of the timelines.

5. The computer-implemented method of claim 1, wherein a gesture generated using the input device terminates a copying procedure that is initiated based on the predefined duration.

6. The computer-implemented method of claim 1, wherein the object comprises a visual representation and underlying data, the visual representation being generated and associated with the cursor in response to the copy of the object being assigned to the cursor, wherein the underlying data is copied in response to a second input.

7. The computer-implemented method of claim 1, wherein the object comprises a visual representation and underlying data, the underlying data being copied in response to the copy of the object being assigned to the cursor.

8. A non-transitory computer storage medium encoded with a computer program, the program comprising instructions that when executed by one or more computers cause the one or more computers to perform operations comprising:
  receiving a first input to an animation creation application, the animation creation application having a user interface that shows a virtual-space area for one or more first objects used in animations, and a timeline area for one or more second objects representing events in the animations, the first input generated by a user pressing and holding an input control of an input device while a cursor controlled by the input device is over one of the first or second objects;
  in response to the first input, determining whether the input control is held for at least a predefined duration; and
  if so, assigning a copy of the object to the cursor, and subsequently pasting the copy at another location in the user interface upon the input control ceasing to be held after the cursor is moved to the other location, wherein for copies of the first objects the other location is in the virtual-space area, and wherein for copies of the second objects the other location is in the timeline area;
  wherein if the input control does not remain held for at least the predefined duration the copy of the object is not assigned to the cursor.

9. The computer program of claim 8, further comprising presenting, in response to the first input, a timer in the user interface that is updated to show a remainder of the predefined duration.

10. The computer program of claim 8, further comprising generating a visual representation that represents the copy, and associating the visual representation with the cursor for moving the copy in the user interface.

11. The computer program of claim 8, wherein the timeline area includes multiple parallel timelines, and wherein the object is located in one of the timelines and wherein the copy is pasted in the same timeline or a different one of the timelines.

12. The computer program of claim 8, wherein a gesture generated using the input device terminates a copying procedure that is initiated based on the predefined duration.

13. The computer program of claim 8, wherein the object comprises a visual representation and underlying data, the visual representation being generated and associated with the cursor in response to the copy of the object being assigned to the cursor, wherein the underlying data is copied in response to a second input.

14. The computer program of claim 8, wherein the object comprises a visual representation and underlying data, the underlying data being copied in response to the copy of the object being assigned to the cursor.

15. A computer system comprising:
  a processor; and
  a non-transitory computer storage medium encoded with a computer program, the program comprising instructions that when executed by one or more computers cause the one or more computers to perform operations comprising:
  receiving a first input to an animation creation application, the animation creation application having a user interface that shows a virtual-space area for one or more first objects used in animations, and a timeline area for one or more second objects representing events in the animations, the first input generated by a user pressing and holding an input control of an input device while a cursor controlled by the input device is over one of the first or second objects;
  in response to the first input, determining whether the input control is held for at least a predefined duration; and
  if so, assigning a copy of the object to the cursor, and subsequently pasting the copy at another location in the user interface upon the input control ceasing to be held after the cursor is moved to the other location, wherein for copies of the first objects the other location is in the virtual-space area, and wherein for copies of the second objects the other location is in the timeline area;
  wherein if the input control does not remain held for at least the predefined duration the copy of the object is not assigned to the cursor.

16. The computer system of claim 15, the operations further comprising presenting, in response to the first input, a timer in the user interface that is updated to show a remainder of the predefined duration.

17. The computer system of claim 15, the operations further comprising generating a visual representation that represents the copy, and associating the visual representation with the cursor for moving the copy in the user interface.

18. The computer system of claim 15, wherein the timeline area includes multiple parallel timelines, and wherein the object is located in one of the timelines and wherein the copy is pasted in the same timeline or a different one of the timelines.

19. The computer system of claim 15, wherein a gesture generated using the input device terminates a copying procedure that is initiated based on the predefined duration.

20. The computer system of claim 15, wherein the object comprises a visual representation and underlying data, the visual representation being generated and associated with the cursor in response to the copy of the object being assigned to the cursor, wherein the underlying data is copied in response to a second input.

21. The computer system of claim 15, wherein the object comprises a visual representation and underlying data, the underlying data being copied in response to the copy of the object being assigned to the cursor.

\* \* \* \* \*